(12) United States Patent
Ozbaysal et al.

(10) Patent No.: US 7,748,601 B2
(45) Date of Patent: Jul. 6, 2010

(54) BRAZED ARTICLES, BRAZE ASSEMBLIES AND METHODS THEREFOR UTILIZING GOLD/COPPER/NICKEL BRAZING ALLOYS

(75) Inventors: Kazim Ozbaysal, Cincinnati, OH (US); David Edwin Budinger, Loveland, OH (US)

(73) Assignee: General Electric Company, Schenectady, NY (US)

( * ) Notice: Subject to any disclaimer, the term of this patent is extended or adjusted under 35 U.S.C. 154(b) by 316 days.

(21) Appl. No.: 11/930,858

(22) Filed: Oct. 31, 2007

(65) Prior Publication Data
US 2009/0305079 A1 Dec. 10, 2009

Related U.S. Application Data

(63) Continuation-in-part of application No. 11/236,953, filed on Sep. 28, 2005, now Pat. No. 7,328,832.

(51) Int. Cl.
B23K 31/02 (2006.01)
B23K 35/24 (2006.01)
F01D 5/12 (2006.01)

(52) U.S. Cl. .................. 228/245; 228/262.72; 415/12; 416/223 R; 428/544

(58) Field of Classification Search .................. None
See application file for complete search history.

(56) References Cited

U.S. PATENT DOCUMENTS 4,903,890 A * 2/1990 Mizuhara ............... 228/262.31
5,368,220 A * 11/1994 Mizuhara et al. .......... 228/124.5
7,461,772 B2 * 12/2008 Ozbaysal ................. 228/245
2004/0086416 A1 * 5/2004 Winstein .................. 420/507
2006/0034972 A1 * 2/2006 Takahashi et al. ........... 425/462
2007/0068992 A1 * 3/2007 Ozbaysal et al. .......... 228/56.3
2007/0087218 A1 * 4/2007 Ozbaysal et al. ........... 428/689
2007/0108253 A1 * 5/2007 Ozbaysal .................. 228/56.3
2008/0020233 A1 * 1/2008 Ozbaysal .................. 428/655
2009/0001137 A1 * 1/2009 Ozbaysal et al. .......... 228/119
2009/0011276 A1 * 1/2009 Ozbaysal .................. 428/673
2009/0047132 A1 * 2/2009 Riley et al. ................ 416/190
2009/0269151 A1 * 10/2009 Oles et al. ................. 407/118

* cited by examiner

Primary Examiner—Kiley Stoner
(74) Attorney, Agent, or Firm—Marcella R. Louke; William Scott Andes; General Electric Company

(57) ABSTRACT

A brazing assembly includes a tungsten/carbide/cobalt substrate (e.g., wear pad), a second substrate including titanium or titanium alloy (e.g., a midspan shroud of a fan or compressor blade) and a brazing material including gold, nickel, and copper present in respective amounts to improve the ductility of the braze joint. A brazed article includes a first substrate, a second substrate, and a braze joint having a post-braze hardness of between 450 and 600 KHN. A method to improve the impact resistance of a braze joint between a tungsten/carbide/cobalt substrate and a substrate including titanium or alloy thereof includes utilizing a brazing material including gold, nickel, and copper and brazing at temperatures less than about 1900° F. (1038° C.).

12 Claims, 2 Drawing Sheets

BRAZED ARTICLES, BRAZE ASSEMBLIES AND METHODS THEREFOR UTILIZING GOLD/COPPER/NICKEL BRAZING ALLOYS

CROSS REFERENCE TO RELATED APPLICATIONS

This application is a Continuation-in-Part of application Ser. No. 11/236,953, filed Sep. 28, 2005, now U.S. Pat No. 7,328,832, which is herein incorporated by reference in its entirety.

TECHNICAL FIELD

Embodiments herein relate generally to brazed articles, braze assemblies, and methods therefor. More particularly, embodiments herein relate to brazing tungsten carbide-cobalt materials to titanium and alloys thereof utilizing gold/copper/nickel brazing alloys.

BACKGROUND OF THE INVENTION

In a gas turbine engine, air is pressurized in a compression module during operation. The air channeled through the compression module is mixed with fuel in a combustor and ignited, generating hot combustion gases which flow through turbine stages that extract energy therefrom for powering the fan and compressor rotors and generating engine thrust to propel an aircraft in flight or to power a load, such as an electrical generator.

The compression system includes a rotor assembly comprising a plurality of rotor blades extending radially outward from a disk. More specifically, each rotor blade has a dovetail which engages with the disk, a platform forming a part of the flow path, and an airfoil extending radially from the platform to a tip. The platform may be made integral to the blade or, alternatively, made separately.

In some designs, the rotor blade, especially those in a fan rotor and the front stages of a multistage compression system, have a pair of circumferentially extending shrouds on the airfoil, one projecting from the pressure surface and one projecting from the suction surface. The shrouds are located at a radial location between the blade dovetail and the blade tip. In some other designs, the shrouds may be located at the tip of the blade airfoil. During normal operation of the compression system, the blades twist and the shrouds on adjacent blades contact with each other, forming a shroud ring that provides support to the blades. During engine operation, the shroud ring resists vibration and twisting of the blades. The term "midspan shroud" is used herein to refer to all supports on fan and compression system blades that contact with each other during operation, and includes all supports located anywhere on the span of the blade, including supports at the tip of the blade. The "midspan shrouds" as used herein, may be located anywhere along the blade span, not just at the midpoint of the span.

During certain abnormal events, such as a bird impact, other foreign object impact, or stalls during engine operation, the normal contact between the shrouds of adjacent blades is disturbed. The contact forces become high and misaligned due to the impacts and the shrouds become disengaged fully or partially. This is called "shingling" of the blades. Shingling causes significant wear and tear damage on the midspan shrouds. When the speed of the compressor rotor drops, the shingled blades may rebound, causing further wear and tear on the shrouds.

Fan or compressor blades sometimes have wear pads brazed on the contact faces of the midspan shrouds. Wear pads have been used on blades to address the wear problem. For example, some compressor blades contain a brazed-on WC—Co wear pad to reduce wear between two rubbing midspan shrouds.

The blades may comprise titanium or alloys thereof (i.e., Ti6Al-4V and/or Ti8Al-1V-1Mo alloys) having beta transus temperatures at or slightly above 1800° F. (about 982° C.). The wear pads are conventionally brazed to the titanium blade using a titanium-copper-nickel (TiCuNi) alloy braze foils. Diffusion occurs between TiCuNi braze foil and WC—Co wear pad during high temperature braze. Titanium forms brittle compounds with the alloying elements of the wear pad in the braze joint. As a result, the braze joint provides a high hardness (about 1200 KHN) W—Co—Ti—Cu—Ni alloy. The braze interface exhibits cracking at impact energies as low as 0.30 Joules, and the wear pad may be liberated from the substrate at the brittle braze interface at an impact energy of about 0.60 Joules.

Industrially available braze alloys have been unable to meet the demands for high ductility and low cost necessary for aircraft engine applications. Accordingly, there is a need for lower cost, high ductility, impact resistant brazing alloys for brazing WC—Co substrates to titanium or titanium alloy substrates. In particular, there is a need for brazing alloys for brazing WC—Co materials to titanium and titanium alloys without forming a brittle braze interface.

BRIEF DESCRIPTION OF THE INVENTION

The above-mentioned need or needs may be met by exemplary embodiments which provide brazing materials that provide high ductility (i.e., low hardness), sufficient wettability to the substrates, and can be brazed without harming the substrates.

An exemplary embodiment includes a brazing assembly comprising a tungsten/carbide/cobalt (WC—Co) substrate, a titanium or titanium alloy substrate, and a brazing material disposed between the substrates. An exemplary brazing material includes 40 to about 60 percent by weight gold, about 5 to about 16 percent by weight nickel, and about 35 to about 55 percent by weight copper.

An exemplary embodiment comprises an article including a first substrate comprising tungsten/carbide/cobalt material, a second substrate comprising titanium or alloys thereof, and a braze joint at the interface of the first substrate and the second substrate. The braze joint is formed from an exemplary brazing material including about 40 to about 60 percent by weight gold, about 5 to about 16 percent by weight nickel, about 35 to about 55 percent by weight copper.

An exemplary embodiment includes a method of improving the impact resistance of a braze joint between a midspan shroud of a fan or compressor blade for a gas turbine engine and a wear pad brazed thereto. The method includes brazing the wear pad to the midspan shroud with a brazing material comprising about 40 to about 60 wt % gold, about 5 to about 16 wt % nickel, and about 35 to about 55 wt % copper wherein the gold, nickel, and copper, are present in respective amounts to provide the brazing material with a post-braze hardness of between about 450 and about 600 KHN, and the braze joint with an impact resistance of greater than about 0.60 Joules.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
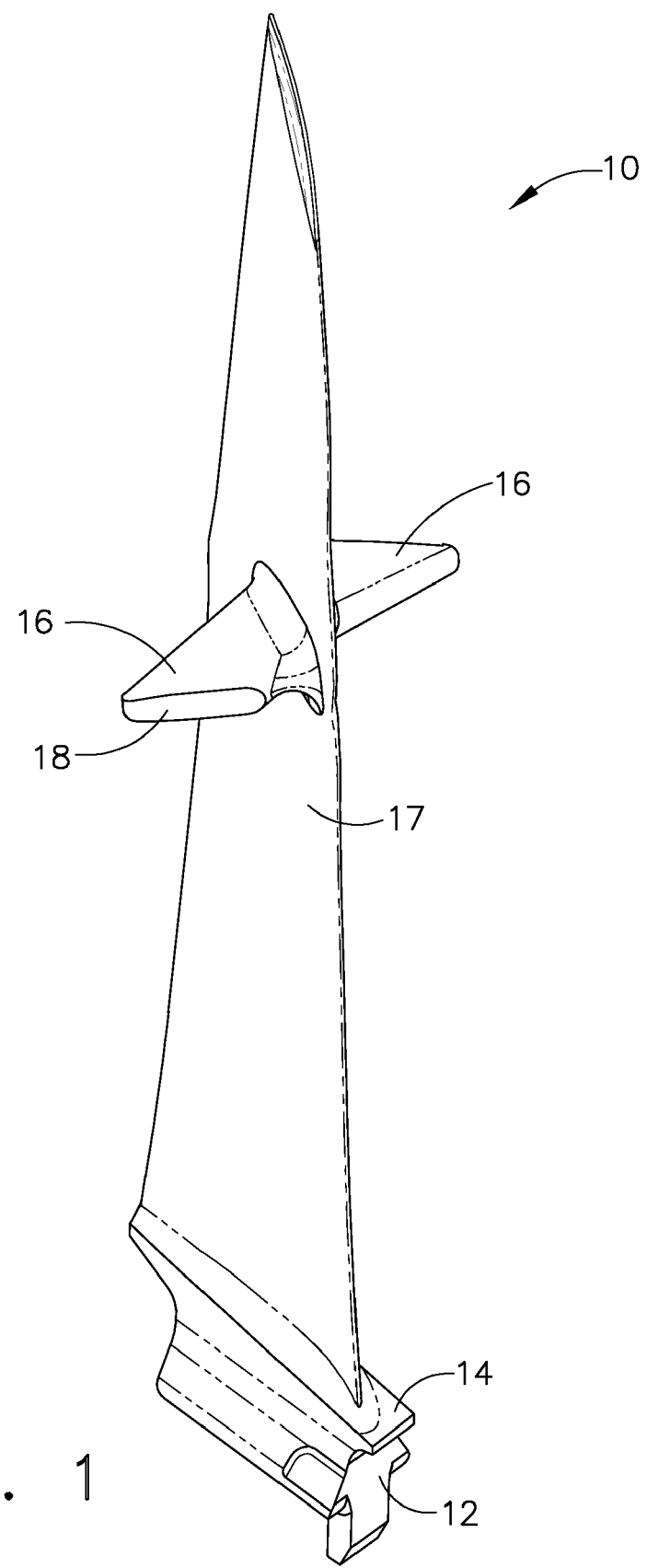
FIG. 1 is a perspective view of an exemplary compressor blade having a midspan shroud.

Referring to the drawings wherein identical reference numerals denote the same elements throughout the various views, FIG. 1 shows an exemplary compressor blade 10 having an airfoil 11, dovetail 12, a platform 14, and a midspan shroud 16 extending from the suction side 17 of the airfoil 11. The midspan shroud 16 includes a contact face 18. It will be appreciated by those with skill in the art that a similar midspan shroud extends from the pressure side of the airfoil. It will further be appreciated by those with skill in the art that blade 10 as shown is identified as a compressor blade, although the descriptions set forth herein are equally applicable to fan blades.

In fan and compressor rotor assemblies, the blades are arranged in the circumferential direction around a disk. During engine operation, the blades airfoils twist, and the midspan shroud on the suction side of a blade comes into contact with the midspan shroud on the pressure side of the adjacent blade. The shrouds, when thus engaged with each other, form a stiff ring supporting the blades to prevent vibration. As the engine shuts down the shrouds disengage. As the engines operate through many cycles, the contact faces of the shrouds are subjected to significant wear and tear.

Figure 2:
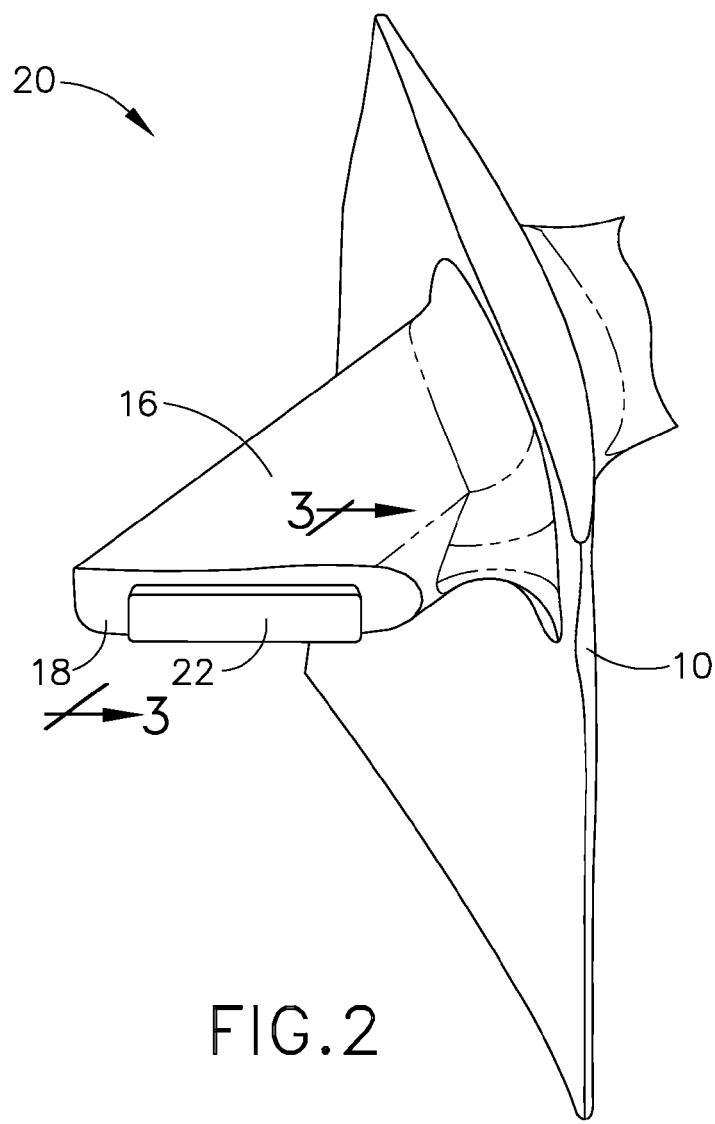
FIG. 2 is a partial perspective view showing an exemplary midspan shroud-wear pad assembly.

FIG. 2 illustrates an exemplary midspan shroud-wear pad assembly 20. In the assembly, a wear pad 22 is shown attached to contact face 18 of the midspan shroud 16. Wear pads are used with midspan shrouds 16 to address the wear problem addressed above. For example, some compressor blades made from titanium or alloys thereof may include a brazed-on WC—Co wear pad to prevent adhesive wear between two contacting midspan shrouds.

Figure 3:
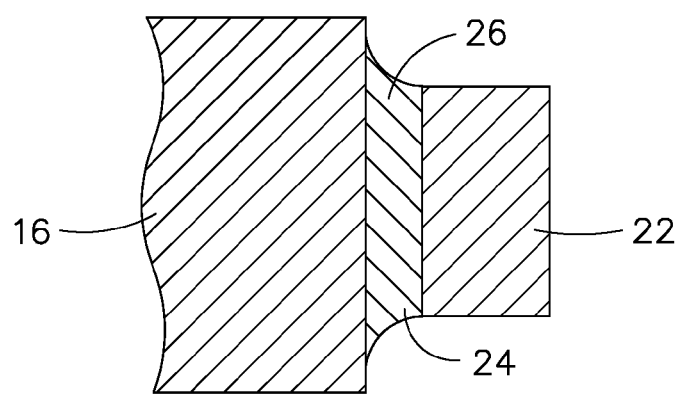
FIG. 3 is a cross-sectional view of the midspan shroud-wear pad assembly taken through 3-3 of FIG. 2.

FIG. 3 illustrates a braze joint 24 at the interface between a midspan shroud 16 and wear pad 22. Braze joint 24 comprises a brazing material 26 that, after brazing, provides an improvement in impact resistance of the braze joint 24 as compared to known prior art braze joints.

Embodiments disclosed here and are directed to brazing materials for brazing a first substrate, such as a WC—Co wear pad 22, to a second substrate, such as a midspan shroud comprising titanium or alloys thereof. Exemplary brazing materials include gold (about 40 to about 60 wt %), nickel (about 5 to about 16 wt %), and copper (about 35 to about 55 wt %).

In an exemplary embodiment, the substrates are brazed under brazing conditions to prevent damage to the mechanical properties of the substrates. In an exemplary embodiment, the brazing temperature is generally not greater than about 1800° F. (about 982° C.), which is generally below the beta transus temperatures of the titanium alloy substrate. In exemplary embodiments, the brazing materials disclosed herein may include a nickel content sufficient to ensure wetting to both WC—Co and titanium substrates, a copper content that is sufficiently high to ensure ductility for impact resistance, and gold content that is reasonably low to ensure adequate cost. Further, the brazing materials disclosed herein are able to braze the first and second substrates using a rapid induction heating process. In an exemplary embodiment, brazing occurs at temperatures below about 1800° F. (about 982° C.) at braze times of from about 1 to about 10 minutes. In an exemplary embodiment, the braze time may be from about 1 minute to about 3 minutes. The induction heating may occur under vacuum of about $10^{-4}$ to about $10^{-5}$ Torr. In an exemplary embodiment, the rapid braze process may allow braze temperatures to be as high as about 1900° F. (about 1038° C.) without damaging the substrates.

In an exemplary embodiment, the weight percentages of gold, nickel, and copper in the brazing material may be selected based upon the intended use of the brazing alloy. In particular, the weight percentages may be selected such that the resulting brazing alloy has a high impact resistance and high ductility (i.e., low hardness) after brazing and brazing temperatures below the beta transus temperature of the substrate such that the mechanical properties of the substrate are not negatively affected, for example, by way of phase transitions by high brazing temperatures. It is contemplated that exemplary embodiments disclosed herein may be brazed at temperatures of up to about 1900° F. (1038° C.) without negatively impacting the substrates.

In an exemplary embodiment the brazing material may include about 40 to about 60% by weight gold, about 5 to about 16% by weight nickel, and about 35 to about 55% by weight copper.

In an exemplary embodiment, the brazing material may include from about 45 to about 49% by weight gold, about 9 to about 11% by weight nickel, and about 35 to about 55% by weight copper.

In an exemplary embodiment, the brazing material may include from about 40 to about 60% by weight gold, about 9 to about 16% by weight nickel, and about 40 to about 55% by weight copper.

In an exemplary embodiment, the brazing material may include from about 45 to about 49 weight % gold, about 9 to about 11 weight % nickel and about 41 to about 55 weight % copper.

In an exemplary embodiment, the brazing material may consist of about 47 weight % gold, about 10 weight % nickel, and about 43 weight % copper.

In an exemplary embodiment, the gold, nickel, and copper are present in amounts such that the brazing material has a post-braze hardness of between 450 and 600 KHN. In an exemplary embodiment, the post-braze hardness may be between about 550 to about 570 KHN. In an exemplary embodiment, the copper content may be between about 40 and about 60 weight %. In an exemplary embodiment, the copper content may be between about 41 to about 55 weight %.

In an exemplary embodiment, nickel is present in an amount sufficient to provide wetting to the first and second substrates during induction heating. In an exemplary embodiment, the duration of the induction heating process is at least about one minute. In an exemplary embodiment, the induction heating process is not greater than about 10 minutes. In an exemplary embodiment, the braze temperature is not greater than about 1800° F. (982° C.). In an exemplary embodiment, the braze temperature is between about 1750° F. (about 954° C.) to about 1800° F. (982° C.). In other exemplary embodiments, the braze temperature may be up to about 1900° F. (1038° C.). In other exemplary embodiments, the braze temperature may be between about 1750° F. (about 954° C.) to about 1900° F. (1038° C.).

The brazing materials disclosed herein may be provided in various forms. For example, the brazing materials may be provided as homogenous compositions including gold, nickel, and copper. In other exemplary embodiments, the brazing materials may be provided as powders. In other exemplary embodiments, the brazing alloys may be provided as layered or laminated films or foils.

In a powdered form, the brazing alloys may be provided as mixtures of gold, nickel, and copper, and/or powders of alloys of one or more of gold, nickel, and copper, wherein the metals are present in the appropriate quantities. In an exemplary embodiment, the powders may form a homogeneous alloy upon being heated to the appropriate brazing temperature. For example, an exemplary brazing material may be provided as a dispersion of copper powder, gold/copper/nickel powder, gold/nickel powder or mixtures thereof as appropriate.

In a layered form, the gold, nickel, copper may be provided in separate layers, thereby providing homogeneous alloys upon being heated to the appropriate brazing temperature. For example, a brazing alloy may be provided as a laminated film or a layered material. In an exemplary embodiment, the brazing material may comprise a layer of copper foil positioned between layers of gold/nickel foil. Any combination of layers may be utilized to provide the alloying metals in the appropriate quantities. In other exemplary embodiments, the brazing material may be provided as layered or laminated films or foils.

In the layered form, the metals or alloys of the gold/nickel/copper brazing material may be provided in separate layers that provide a substantially homogeneous alloy during the brazing process. Those skilled in the art will appreciate that various arrangements and numbers of layers and various combinations of metals and/or alloys are within the scope of this disclosure. The layered material may be used in a flat (i.e., planar) configuration, or may be rolled or otherwise shaped prior to brazing.

EXAMPLE 1

A brazing material is prepared by positioning a copper foil between two layers of gold/nickel braze foil. The thickness of each layer was selected such that the resulting material included about 47 wt % gold, about 10 wt % nickel, and about 43 wt % copper with respect to the total weight of the layered material. The resulting material had a brazing temperature of about 1775° F. (about 968° C.).

EXAMPLE 2

A brazing material was prepared by positioning a copper foil between two layers of gold/nickel braze foil. The thickness of each layer was selected such that the resulting material included about 53 wt % gold, about 11 wt % nickel and about 36 wt % copper with respect to the total weigh of the layered material. The resulting layered material has a brazing temperature of about 1795° F. (about 979° C.).

EXAMPLE 3

The brazing material of Example 1 was rolled up and positioned between a WC—Co (2-10% cobalt) wear pad and a titanium alloy (90 wt % Ti, 6 wt % Al and 4 wt % V) midspan shroud and the assembly was raised to a temperature of about 1800° F. (by way of induction heating) for about 10 minutes under vacuum (about $10^{-4}$ Torr). After the assembly was allowed to cool, the braze joint was determined to have a hardness of about 550 KHN.

EXAMPLE 4

The brazing material of Example 2 was rolled up and positioned between a WC—Co (2-10% cobalt) wear pad and a titanium alloy (90 wt % Ti, 6 wt % Al and 4 wt % V) midspan shroud and the assembly was raised to a temperature of about 1800° F. (by way of induction heating) for about 10 minutes under vacuum (about $10^{-4}$ Torr). After the assembly was allowed to cool, the braze joint was determined to have a hardness of about 570 KHN.

EXAMPLE 5

An exemplary gold/nickel/copper brazing material as disclosed herein was employed to braze a WC—Co wear pad to the midspan shroud (e.g., 16) of an airfoil (e.g., 11). The braze temperature reached about 1885° F. (about 1029° C.) at some locations. A cut-up inspection of the airfoil showed no damage from the brazing process to the body of the airfoil.

Accordingly, the gold/nickel/copper brazing alloys disclosed herein are ductile and impact resistant with respect to titanium/nickel/copper brazing alloys and exhibit excellent wetting when used to join various WC—Co material to various titanium alloys.

In an exemplary embodiment, a method for improving the impact resistance of a braze joint 24 between a first substrate (i.e., wear pad 22) and a second substrate. (i.e., midspan shroud 16) includes providing a brazing assembly including the first substrate the second substrate and a brazing material disposed therebetween. Any of the aforementioned exemplary brazing materials 26 may be utilized. In particular, the wear pad 22 may be brazed to the contact surface 18 of the midspan shroud. In an exemplary embodiment, the brazing material comprises gold, nickel, and copper in respective amounts such that, after brazing, the braze joint 24 has a hardness of between about 450 and 600 KHN and an impact resistance of greater than about 0.60 Joules. The brazing material may be provided in any of the aforementioned forms, including layered, powdered, or homogeneous forms.

In an exemplary method, providing a midspan shroud includes providing a midspan shroud requiring repair due to a damaged wear pad. In an exemplary method, the damaged wear pad is removed by mechanical, chemical or a combination of mechanical and chemical methods. For example, the midspan shroud of a blade may be subjected to a grinding process to remove the worn wear pad and prior braze material. Alternately, the worn wear pad may be chemically removed. If necessary, the midspan shroud may be subjected to further processes in preparation for brazing on a new wear pad (i.e., material build up, machining to specifications, and the like).

An exemplary method further includes brazing the first substrate to the second substrate. In an exemplary method, an induction heating process is utilized for brazing. The brazing assembly (i.e., midspan shroud 16, brazing material 26, wear pad 22) may be placed into a vacuum chamber. The midspan shroud 16 may be placed into an induction coil. AC current passing through the coil generates a magnetic field in the midspan shroud, generating eddy currents in the shroud to rapidly increase the temperature to the brazing range. In exemplary embodiments, the brazing temperature is between about 1750° F. (about 954° C.) to about 1800° F. (982° C.). Duration for the braze may be about 1-3 minutes. In other exemplary embodiments, the braze temperature may be as high as about 1900° F. (about 1038° C.). An exemplary braze duration may be up to about 10 minutes. In an exemplary embodiment, the braze duration is at least about 1 minute. In an exemplary embodiment, the brazing is accomplished under vacuum of about $10^{-4}$ to about $10^{-5}$ Torr.

With reference to FIGS. 1-3, an exemplary embodiment comprises an article including at least one braze joint. The article may be a fan or compressor blade 10. The blade 10 may include a midspan shroud-wear pad assembly 20. The wear pad 22 is attached to contact face 18 of the midspan shroud through the braze joint 24. Braze joint 24 is formed from any of the exemplary brazing materials disclosed herein. The braze joint 24 exhibits increased ductility (decreased hardness) and thus provides improved impact resistance.

Exemplary embodiments include a braze assembly illustrated in FIG. 3. An exemplary braze assembly includes a first substrate, such as wear pad 22 which may comprise WC—Co. The exemplary braze assembly includes brazing material 26 disposed between the first and second substrates. An exemplary brazing material comprises about 40 to about 60 percent by weight gold, about 5 to about 16 percent by weight nickel, and about 35 to about 55 percent by weight copper. Other exemplary brazing materials disclosed here may be used in the braze assembly.

Thus, embodiments disclosed herein provide braze assemblies, brazing materials, methods of improving the impact resistance of a brazed joint, and brazed articles. The brazing materials disclosed herein provide post-braze joints having increased ductility. The gold/nickel/copper brazing materials disclosed herein provide good wetting when brazing WC—Co substrates to titanium or alloys thereof under brazing conditions to minimize or prevent damage to the substrates. For example, the brazing temperature may be less than about 1800° F. (982° C.) during induction heating of less than about 10 minutes. In other exemplary embodiments, rapid induction heating may allow for increased braze temperatures of up to about 1900° F. (about 1038° C.).

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A brazing assembly comprising:
   a first substrate comprising tungsten/carbide/cobalt (WC—Co);
   a second substrate comprising titanium or alloys thereof; and
   a brazing material disposed between the first and second substrates, wherein the brazing material comprises about 40 to about 60 percent by weight gold, about 5 to about 16 percent by weight nickel, and about 35 to about 55 percent by weight copper.

2. The brazing assembly according to claim 1 wherein in the brazing material, nickel is present in an amount sufficient to provide wetting to the first and second substrates during induction heating of not greater than 10 minutes at braze temperatures of not greater than about 1900° F. (about 1038° C.) and wherein copper is present in an amount sufficient to provide a post-braze hardness of between 450 and 600 KHN.

3. The brazing assembly according to claim 1 wherein the brazing material is in a form selected from a homogeneous alloy form, a powder form, or a layered form.

4. The brazing assembly according to claim 3 wherein the brazing material is in the layered form, wherein the layered form includes at least one layer consisting essentially of copper.

5. The brazing assembly according to claim 3 wherein the brazing material is in the layered form, wherein the layered form includes at least one layer of gold/nickel alloy, and at least one layer of copper.

6. The brazing assembly according to claim 1 wherein the brazing material includes from about 40 to about 60 wt % copper.

7. The brazing assembly according to claim 1 wherein the brazing material consists of:
   about 40 to about 60 percent by weight gold:
   about 5 to about 16 percent by weight nickel; and
   about 35 to about 55 percent by weight copper.

8. The brazing assembly according to claim 1 wherein the first substrate comprises a wear pad and the second substrate comprises a midspan shroud of a fan or compressor blade for a gas turbine engine.

9. An article comprising:
   a first substrate comprising tungsten/carbide/cobalt material;
   a second substrate comprising titanium or alloys thereof; and
   a braze joint at the interface of the first substrate and the second substrate, wherein the braze joint is formed from a brazing material including about 40 to about 60 percent by weight gold, about 5 to about 16 percent by weight nickel, about 35 to about 55 percent by weight copper.

10. The article according to claim 9 wherein the second substrate is a midspan shroud of a fan or compressor blade for a gas turbine engine.

11. The article according to claim 10 wherein the first substrate is a wear pad.

12. The article of claim 11 wherein the wear pad is brazed to a contact face of the midspan shroud, and wherein the braze joint has an impact resistance of greater than about 0.60 Joules.

* * * * *